United States Patent [19]

Fujii et al.

[11] Patent Number: 4,959,738
[45] Date of Patent: Sep. 25, 1990

[54] METHOD AND APPARATUS FOR DRIVING A STEPPING MOTOR

[75] Inventors: Hiroshi Fujii; Shinji Katsuki, both of Tokyo, Japan

[73] Assignee: Sony Corporation, Tokyo, Japan

[21] Appl. No.: 325,978

[22] Filed: Mar. 20, 1989

[30] Foreign Application Priority Data

Mar. 29, 1988 [JP] Japan ................................. 63-75518

[51] Int. Cl.$^5$ ........................ G11B 5/58; H02K 29/04
[52] U.S. Cl. .................................. 360/78.13; 318/685; 318/696
[58] Field of Search ............... 360/78.06, 78.08, 78.13, 360/77.17; 318/685, 696

[56] References Cited

U.S. PATENT DOCUMENTS

| 4,437,049 | 3/1984 | Tullos et al. | 360/78.13 X |
| 4,609,953 | 9/1986 | Mizuno et al. | 38/685 X |
| 4,612,588 | 9/1986 | Tsukahara | 360/78.13 X |
| 4,680,524 | 7/1987 | Do et al. | 318/685 X |
| 4,691,154 | 9/1987 | Sato et al. | 318/685 X |

Primary Examiner—Vincent P. Canney
Attorney, Agent, or Firm—Alvin Sinderbrand

[57] ABSTRACT

In driving a stepping motor which, for example, is used to effect tracking movements of a head in an electronic still camera or other magnetic disk recording and/or reproducing apparatus, and which has a rotor and a plurality of phases to which input pulses are applied in predetermined sequences for establishing excitation states by which the rotor is stepped to respective positions, the input pulses are controlled for alternating between first and second excitation states corresponding to adjacent stepped positions between which it is desired to bring the rotor to rest. Such alternation is initially effected at a relatively low frequency so that the rotor oscillates between the stepped positions corresponding to the first and second excitation states, respectively, and then the frequency of alternation between the first and second excitation states is gradually increased to a value at which the rotor no longer oscillates with such alternation and comes to rest at a position between the stepped positions. A duty ratio is selected for the first and second excitation states which inversely corresponds to the ratio of the distances from the desired position of rest of the rotor to the stepped positions of the latter corresponding to the first and second excitation states, respectively, and such duty ratio is applied to the alternation between the first and second excitation states at least during the increasing of the frequency of alternation to the value at which the rotor no longer oscillates.

21 Claims, 4 Drawing Sheets

| EXCITATION STATE | 0 | 1 | 2 | 3 |
|---|---|---|---|---|
| CURRENT | A→Ā | B→B̄ | Ā→A | B̄→B |
| | B→B̄ | Ā→A | B̄→B | A→Ā |

METHOD AND APPARATUS FOR DRIVING A STEPPING MOTOR

BACKGROUND OF THE INVENTION

1. Field of the Invention

This invention relates generally to the driving of stepping motors and, more particularly is directed to a method of driving a stepping motor so as to make the latter suitable for effecting tracking movements of a magnetic pick up or head in respect to a magnetic disk, for example, as in an electronic still camera.

2. Description of the Prior Art

In an existing electronic still camera, a rotated magnetic disk is employed for the recording of video signals corresponding to still pictures or images in respective circular tracks on the magnetic disk. Usually, a magnetic recording and/or reproducing head is carried by an arm mounted for rectilinear movements substantially parallel to a radius of the rotated magnetic disk so that the head can be made to record and/or reproduce a video signal in a selected circular track on the disk when such selected track is traced by the head. Since the track pitch or radial distance between adjacent tracks on the magnetic disk is quite small, for example, 100 $\mu$m, the movements of the arm for causing tracking of the head in respect to a selected track are minute, for example, of the order of 10 $\mu$m. Therefore, when a stepping motor is employed to effect the rectilinear movements of the arm carrying the magnetic head for tracking by the latter, it is conventional to provide reduction gearing between a rotor of the stepping motor and a lead screw for propelling the rectilinearly movable arm. However, problems arise when reduction gearing is interposed between the rotor of the stepping motor and the mechanism by which rotary movements of the rotor are converted into rectilinear movements of the arm supporting the magnetic head for effecting tracking. More specifically, the presence of the reduction gearing increases the cost of the apparatus and reduces the speed with which the tracking movements of the magnetic head can be effected. Furthermore, the positioning accuracy is deteriorated due to backlash in the reduction gearing.

In order to improve the accuracy with which a driven member can be positioned by a stepping motor, a so-called micro-stepping method has been proposed for driving the stepping motor. In accordance with such micro-stepping method, a stepping motor having a rotor or driven member and a plurality of phases or windings to which input pulses are applied in predetermined sequences for establishing excitation states by which the rotor is stepped to respective positions, is operated so as to bring the rotor to rest at a desired position intermediate stepped positions which correspond to first and second excitation states, respectively. For example, if the ratio of the distances from the desired position of rest of the rotor to the stepped positions corresponding to the first and second excitation states, respectively, is 1:3, the first and second excitation states are alternately employed with a duty ratio of 3:1, that is, with a duty ratio which inversely corresponds to the ratio of the distances from the desired position of rest of the rotor to the stepped positions of the latter corresponding to the first and second excitation states, respectively. Furthermore, the frequency of the alternation between the first and second excitation states is made sufficiently high so that the rotor of the stepping motor and the system to be driven thereby, such as, the rectilinearly moveable head-supporting arm, do not oscillate or vibrate in response to the alternation of the excitation states.

However, the proposed micro-stepping method for operating or driving a stepping motor is disadvantageous in that the desired minute angular movement of the rotor of the stepping motor may be absorbed by the backlash or play in the system to be driven, for example, in the lead screw and follower pin by which the arm supporting the magnetic head is rectilinearly moved in response to turning of the rotor, so that the head is not moved at all. In other words, even if the rotor of the stepping motor is angularly displaced to extent calculated to achieve precise tracking of a selected track by the magnetic head, the actual movement of the head may not precisely correspond to that angular displacement of the rotor due to mechanical play in the motion transmitting system.

Although it has been suggested to employ a so-called uni-directional feed in which, during the microstepping operation of a stepping motor, the alternation between first and second excitation states always starts with the same one of such states, it has been found that even such uni-directional feed does not reliably achieve the accurate positioning of the head for tracking purposes due to the mechanical loss or play in the motion transmitting system.

OBJECTS AND SUMMARY OF THE INVENTION

Accordingly, it is an object of this invention to provide a method and apparatus in which a stepping motor is driven so as to precisely position the rotor between stepped positions thereof, and which avoids the above described disadvantages of the prior art.

More specifically, it is an object of this invention to provide a method and apparatus in which a stepping motor is driven so as to achieve minute displacements of a driven member, that is, displacements smaller than those corresponding to the natural steps of the rotor, without interposing reduction gearing between the rotor and the driven member.

A further object is to provide a method and apparatus in which a stepping motor is driven, as aforesaid, by subdividing a natural step of the rotor and a member driven thereby is precisely positioned in correspondence to such subdivision of the natural step.

In accordance with an aspect of this invention, in driving a stepping motor having a driven member or rotor and a plurality of phases to which input pulses are applied in predetermined sequences for establishing excitation states by which the driven member is stepped to respective positions, the input pulses are applied so as to alternate between first and second excitation states corresponding to respective stepped positions which are adjacent each other and between which it is desired to bring the driven member to rest, with such alternation being initially effected at a frequency at which the driven member or rotor is made to oscillate between the stepped positions corresponding to such first and second excitation states, respectively. Then, the frequency of alternation between the first and second excitation states is gradually increased to a value at which the driven member no longer oscillates with such alternation and comes to rest at a position between the stepped positions corresponding to the first and second excitation states, respectively. A duty ratio is selected for the first and second excitation states which inversely corresponds to the ratio of the distances from the desired position of rest of the driven member to the stepped positions of the latter corresponding to the first and second excitation states, respectively, and such duty ratio is applied to the alternation between the first and second excitation states at least during the increasing of the frequency of alternation to the value at which the driven member no longer oscillates.

In a preferred embodiment of the invention, the selected duty ratio which inversely corresponds to the ratio of distances from the desired position of rest of the driven member to the stepped positions of the latter corresponding to the first and second excitation states, respectively, is also applied to the alternation between the first and second excitation states at the initially effected relatively low frequency at which the driven member, and any mechanical transmission system coupled therewith is made to oscillate between positions corresponding to the first and second excitation states, respectively. Such oscillation or vibration of the driven member of the stepping motor and of the mechanical transmission system coupled therewith exceeds the mechanical play or loss in such transmission system. As the frequency of the alternation between the first and second excitation states is gradually increased, while maintaining the selected duty ratio for the first and second excitation states, the driven member of the stepping motor and the mechanical transmission system driven thereby vibrate to a decreasing extent so that the mechanical play is uniformly distributed at the opposite limits of the oscillation or vibration. When the frequency of alternation between the first and second excitation states is increased to the value at which the rotor or driven member no longer oscillates with such alternation, the mechanical motion transmission system is stopped precisely at the desired position determined by the selected duty ratio.

The above, and other objects, features and advantages of the invention, will be apparent in the following detailed description of an illustrative embodiment of the invention when read in connection with the accompanying drawings forming a part hereof, and in which corresponding parts are identified by the same reference numerals in the several views of the drawings.

DESCRIPTION OF A PREFERRED EMBODIMENT

Figure 1:
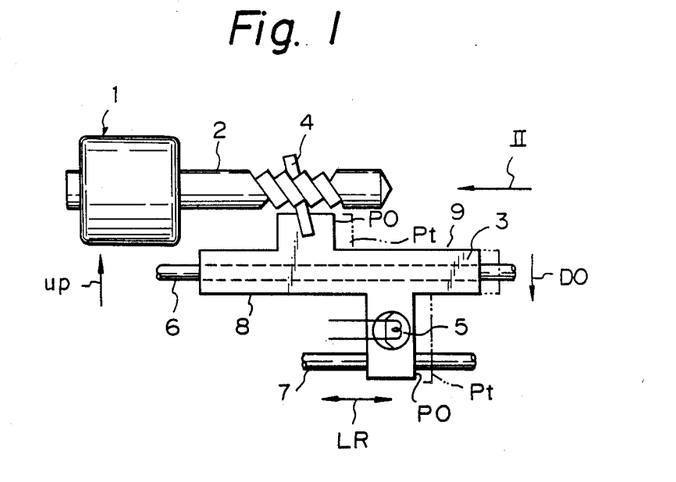
FIG. 1 is a front elevational view of a portion of a known electronic still camera including a stepping motor that may be advantageously driven in accordance with an embodiment of this invention.
Figure 2:
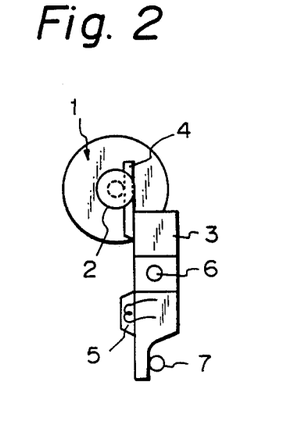
FIG. 2 is a side elevational view of the apparatus shown in FIG. 1 as viewed in the direction indicated by the arrow II on that view.
Figure 3:
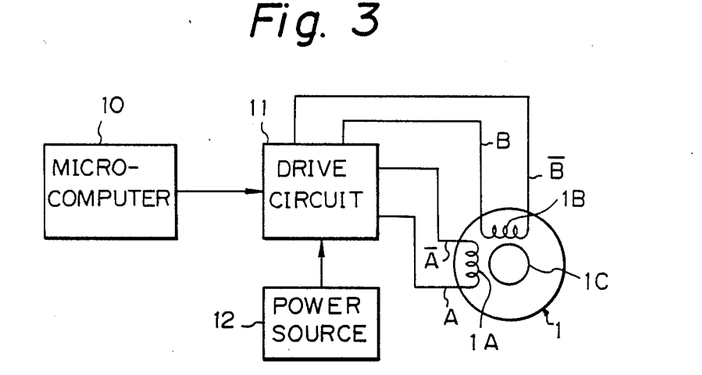
FIG. 3 is a block diagram showing a driving circuit that may be employed for driving the stepping motor of the apparatus in FIGS. 1 and 2 in accordance with an embodiment of this invention.

Referring to the drawings in detail, and initially to FIGS. 1 and 2, it will be seen that the invention is advantageously applicable to the driving of a stepping motor 1 which is included in an electronic still camera and which has stator windings or phases 1A and 1B and a rotor 1C (FIG. 3). The rotor 1C of the stepping motor is directly coupled to a lead screw 2 which, with a follower pin 4 extending from an arm 3 and engageable in a groove of the lead screw 2, forms a mechanical transmission for converting rotary or angular movements of the rotor 1C into rectilinear movements of the arm 3 in the directions of the arrows LR on FIG. 1. A magnetic head 5 is suitable situated on the arm 3 so as to be movable along a radius of a rotated magnetic disk (not shown) in response to the movements of the arm 3 in the directions of the arrows LR under the guidance of guide rods 6 and 7. Additional mechanisms (not shown) are desirably provided to prevent canting or swinging of the arm 3, for example, angular displacements of the arm 3 relative to the axis of the guide rod 6 such as would result in the movements of the opposite end portions 8 and 9 of the guide rod in the directions of the arrows UP and DO, respectively, on FIG. 1. It will be appreciated that turning of the rotor 1C of the stepping motor 1, and hence of the lead screw 2, which is converted into rectilinear movements of the arm 3 with accompanying movements of the magnetic head 5 in the radial direction of the rotated magnetic disk, makes it possible for the head 5 to track or trace a selected circular track on the disk for recording or reproducing a video signal in such circular track.

As shown in FIG. 3, the apparatus for driving the stepping motor 1 in accordance with this invention comprises a micro-computer 10 which provides excitation control signals to a drive circuit 11. The drive circuit 11 is also connected with a power source 12 and is operative, in response to the excitation control signals from the micro-computer 10, to apply input pulses in predetermined sequences to the phases 1A and 1B of the stepping motor 1 for establishing excitation states 0, 1, 2 and 3 of the motor by which the rotor 1C is stepped or angularly displaced to respective stepped positions. More specifically, and as shown on FIGS. 4 and 5, for the excitation state 0, the drive circuit 11 provides current flows through the phase 1A in the direction from line A to line $\overline{A}$ and through the phase 1B in the direction from line B to line $\overline{B}$. For the excitation state 1, the drive circuit 11 provides current flows through the phases 1B and 1A in the direction from line B to line $\overline{B}$ and in the direction from the line $\overline{A}$ to the line A, respectively. Similarly, for the excitation state 2, the current flows are established in the direction from the line $\overline{A}$ to the line A and in the direction from the line $\overline{B}$ to the line B, whereas, for the excitation state 3, the current flows are provided in the direction from the line $\overline{B}$ to the line B and in the direction from the line A to the A.

Figure 4:
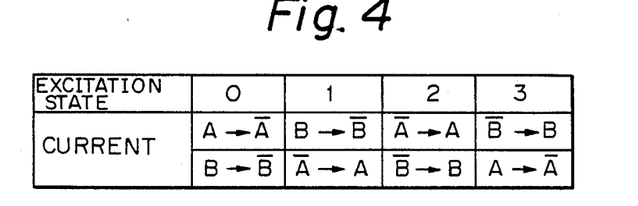
FIG. 4 is a schematic diagram illustrating the directions of current flow through the phases of the stepping motor in FIG. 3 for the various excitation states achieved in the case of a two-phase excitation.
Figure 5:
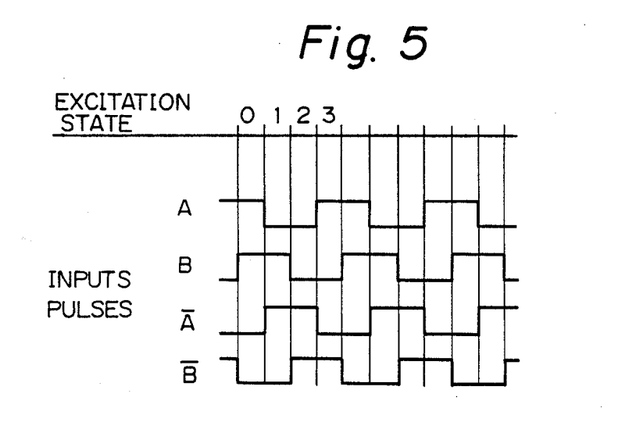
FIG. 5 is a schematic diagram illustrating the sequences in which input pulses are applied to the phases of the stepping motor for the two-phase excitation.

If the pulse-like currents shown on FIGS. 4 and 5 to be characteristic of the excitation states 0, 1, 2 and 3 are provided, in sequence, such excitation states occur in the same order and sequence for stepping the rotor 1C to respective stepped positions that are angularly spaced from each other by 90°. In a practical example of the apparatus shown on FIGS. 1 and 2, the lead screw 2 may be designed and dimensioned so that the magnetic head 5 is moved in the direction of the arrows LR through a distance of 100 μm corresponding to the track pitch in response to the turning of the rotor 1C by two steps, for example, the two steps corresponding to the change-over from excitation state 0 to excitation state 1, and then from excitation state 1 to excitation state 1 to excitation state 2. In other words, each 90° or natural step of the rotor 1C corresponds, in the example being described, to a 50 μm movement of the head 5. Thus, if it is assumed that, for the purposes of tracking, the magnetic head 5 is to be moved only through a distance of 10 μm from an initial position PO to a correct tracking position $P_t$ on FIG. 1, it is apparent that such small movement of the head cannot be achieved by the turning of the rotor 1C of the stepping motor 1 through a natural step thereof.

Therefore, in the example given, that is, in the case where the magnetic head 5 is moved through a distance of 50 μm in response to one step of the rotor 1C, for example, from the position corresponding to the excitation state 0 to the position corresponding to the excitation state 1, the movement of the head through the distance of 10 μm for tracking purposes is achieved by dividing a natural step, for example, the step between the positions of the rotor corresponding to the excitation states 0 and 1, into 5 equal portions and then disposing the rotor 1C at a position corresponding to one of such step portions measured from the stepped position corresponding to the excitation state 0 as a starting point. More particularly, the stepping motor 1 is operated, as hereinafter described in detail so as to bring the rotor 1C to rest at a position where there is a ratio of 1:4 between the distances from the position of rest of the rotor desired for tracking of a selected track by the head 5 to the stepped positions of the rotor corresponding to the excitation states 0 and 1, respectively. In order to achieve such positioning of the rotor intermediate stepped positions which are adjacent each other, for example, which correspond to the excitation states 0 and 1, such excitation states are alternately employed with a duty ratio thereof which inversely corresponds to the ratio of the distances from the desired position of rest of the rotor 1C to the stepped positions of the latter corresponding to the excitation states 0 and 1, respectively. In other words, in the case where the ratio of the distances from the desired position of rest of the rotor 1C to the stepped positions of the latter corresponding to the excitation states 0 and 1, respectively, is 1:4, the duty ratio selected for the excitation states 0 and 1 is 4:1, respectively.

Figure 6A:
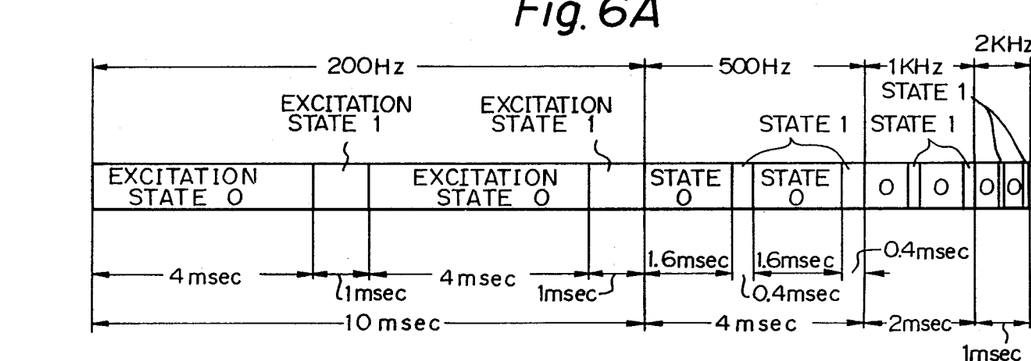
FIG. 6A is a diagram illustrating the alternation between two excitation states with a selected duty ratio in accordance with an embodiment of this invention.

In accordance with the present invention, the alternation between the excitation states, for example, the states 0 and 1, corresponding to respective stepped positions which are adjacent each other and between which it is desired to bring the rotor 1C to rest, is initially effected at a relatively low frequency, for example, the frequency of 200 Hz, as indicated on FIG. 6A, and at which the rotor 1C oscillates between the stepped positions corresponding to the excitation states 0 and 1, respectively. Thereafter, in accordance with this invention, the frequency of alternation between the excitation states 0 and 1 is gradually increased, for example, to 500 Hz, 1 kHz and 2 kHz, again as shown on FIG. 6A, so that the frequency of alternation between the excitation states 0 and 1 finally attains a value, for example, the frequency of 2 kHz, at which the rotor 1C no longer oscillates with such alternation and comes to rest at a position between the stepped positions corresponding to the excitation states 0 and 1, respectively. Furthermore, the duty ratio for the excitation states 0 and 1 which, for example, has been selected to be 4:1 as previously indicated, is applied to the alternation between the excitation states 0 and 1 at least during the increasing of the frequency of alternation to the value at which the rotor 1C no longer oscillates.

Figure 7:
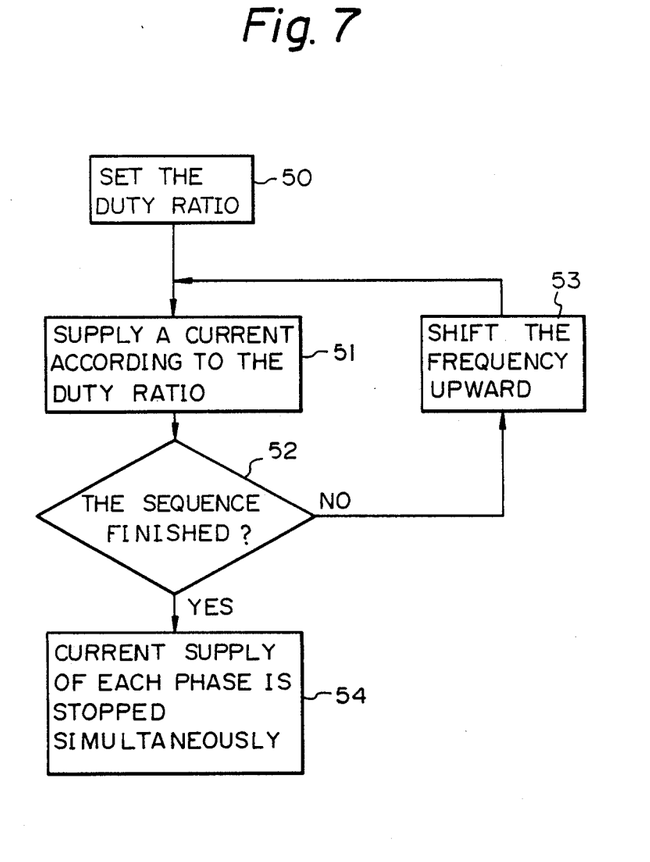
FIG. 7 is a flow diagram to which reference will be made in explaining the driving of a stepping motor in accordance with this invention.

A specific operation of the stepping motor 1 in accordance with a method embodying the present invention will now be described with reference to FIG. 6A which illustrates a control sequence determined by the microcomputer 10 when operating in accordance with the program illustrated by the flow chart of FIG. 7 for moving the magnetic head 5 a distance, for example, of 10 μm, suitable for tracking. At the commencement of the control sequence, that is, in the step 50 on FIG. 7, the computer 10 calculates and sets the duty ratio, for example, the ratio of 4:1, which is the inverse of the ratio (1:4) of the distances from the desired position of rest of the rotor 1C to the stepped positions of the latter corresponding to the excitation states, for example, the states 0 and 1, between which it is desired to bring the rotor to rest. Upon such selection of the duty ratio, the program advances to the step 51 in which the excitation states 0 and 1 are alternately established for times in accordance with the previously calculated duty ratio, with the initial alternation of the excitation states 0 and 1 being effected at a relatively low frequency, for example, of 200 Hz. In such case, each period during which the excitation states 0 and 1 are established, in that order, has a total duration of 5 msec and, since the duty ratio has been calculated to be 4:1, during each such period, the excitation state 0 is established for 4 msec and the excitation state 1 is established for 1 msec. Further, in the specific example shown in FIG. 6A, alternation at the low frequency of 200 Hz is effective for two periods, that is, for 10 msec. With the alternation between the excitation states 0 and 1 being effected at the low frequency of 200 Hz, the rotor 1C of the stepping motor 1 is oscillated at the frequency 200 Hz for the time 10 msec corresponding to two periods between the stepped positions of the rotor corresponding to the excitation states 0 and 1, respectively. Since the follower pin 4 extending from the arm 3 is suitably urged into contact with the lead screw 2 by a suitably applied force which substantially takes up or absorbs the mechanical play therebetween, the whole system to be driven, including the rectilinearly movable arm 3 and the magnetic head 5 thereon, is reciprocated a distance of approximately 50 μm corresponding to a natural step of the rotor 1C between its positions corresponding to the excitation states 0 and 1, and which exceeds any mechanical loss or play that remains in the system. Thus, the whole system to be driven vibrates at the frequency of 200 Hz during the initial 10 msec of the control sequence.

At the completion of two periods of alternation between the excitation states 0 and 1 at the frequency of 200 Hz with the duty ratio 4:1, the program advances to the step 52 in which it is determined whether or not the control sequence is completed. Since the control sequence is not completed at the conclusion of the alternation between the excitation states 0 and 1 at the frequency of 200 Hz, the frequency of alternation is shifted upwardly in the step 53, for example, to the frequency 500 Hz, and the program returns to the step 51. At this time, the alternation between the excitation states 0 and 1 is repeated for two periods, each having a duration of 2 m sec with the duty ratio of the excitation states 0 and 1 being maintained at 4:1 so that, in each period, the excitation state 0 is maintained for 1.6 msec and is followed by the excitation state 1 for 0.4 msec, as shown on FIG. 6A. Thus, for a period of 4 msec, the rectilinearly movable arm 3 is vibrated at the increased frequency of 500 Hz.

Once again, in the step 52, it is determined that the control sequence is not completed and the program returns to the step 53 in which the frequency of alternation between the excitation states 0 and 1 is further increased to 1 kHz so that one period of the alternation between the excitation states 0 and 1 has a duration of 1 msec. Since the duty ratio for the alternation of the excitation states and 1 is maintained at 4:1, during each of two periods, the excitation state 0 is applied for 0.8 msec and the excitation state 1 is applied thereafter for 0.2 msec. At the completion of two such periods, that is, after 2.0 msec, it is determined in the step 52 that the control sequence is not finished and, as a consequence thereof, the program is returned through the step 53 to the step 51. At this time, in the step 53, the frequency of alternation between the excitation states 0 and 1 is further increased to 2 kHz, while the duty ratio is maintained at 4:1. Thus, in the succeeding step 51, during each of two periods, the excitation state 0 is established for 0.4 msec and is followed by the excitation state 1 for a duration of 0.1 msec. The alternation between the excitation states 0 and is continued for two periods, that is, for 1 m sec, as shown on FIG. 6A, and, at the completion thereof, it is determined in step 52 that the control sequence is finished Thereupon, in the next step 54, the supplying of currents from the drive circuit 11 to the phases 1A and 1B of the stepping motor 1 is halted simultaneously so as to prevent the generation of noise and to conserve energy.

It will be noted that, in the above described method of operating the stepping motor 1 in accordance with the present invention, as the frequency of alternation between the excitation states 0 and 1 is increased from its initial relatively low level or band, for example, the band including 200 Hz and 500 Hz, the rectilinearly movable arm 3 vibrates in a manner for substantially equally distributing any mechanical play remaining in the motion transmitting system, that is, the lead screw 2 and follower pin 4, in both of the vibrating directions indicated by the arrows L R on FIG. 1. When the frequency of alternation of the excitation states 0 and 1 attains a suitably high frequency, for example, the frequency of 2 kHz, the rotor 1C, and hence the rectilinearly movable arm 3, no longer oscillates or vibrates in response to the alternation of the excitation states. Therefore, the amplitude of the vibration of the rectilinearly movable arm 3 is gradually attenuated as the frequency of alternation between the excitation states 0 and 1 is increased until finally the arm 3 comes to rest at a position which is precisely 1/5th of one step from the position corresponding to the excitation state 0, considered as a starting point. In other words, the position of rest of the arm 3 precisely is spaced from the positions thereof corresponding to the excitation states 0 and 1 by distances having the ratio 1:4. From the foregoing, it will be apparent that, in the described example, the magnetic head 5 has been moved by the distance 10 μm from its initial position PO on FIG. 1 to the tracking position Pt where the head comes to rest. Therefore, the stepping motor 1 can be made to accurately and rapidly dispose the head 5 at any desired position in respect to the rotated magnetic disk.

Although the invention has been described above with reference to the case where the excitation state 0 has been taken as the starting point for the alternation between the excitation states 0 and 1, it is to be understood that the invention is not limited to such selected starting point. For example, as illustrated on FIG. 6B, if the duty ratio for the excitation states 0 and 1 is maintained at 4:1, respectively, it is possible to bring the rotor 1C to the same position of rest, that is, spaced by 1/5th step from the position corresponding to the excitation state 0 in the direction toward the position corresponding to the excitation state 1, even though the alternation between the excitation states 0 and 1 starts with the excitation state 1. More specifically, whether the alternation between the excitation states 0 and 1 commences with the excitation state 0, as in FIG. 6A, or with the excitation state 1, as in FIG. 6B, the final or rest position of the rotor 1C, and hence of the head 5, will be precisely the same, and is determined by the selected duty ratio. More specifically, and as shown on FIG. 6B, during each period of alternation between the excitation states 1 and 0, in that order, the durations of the excitation states 1 and 0 are in the ratio 1:4, respectively. Once again, in the specific example of FIG. 6B, two periods of alternate excitation in the states 1 and 0 are initially effected at the frequency of 200 Hz, and then at the frequency of 500 Hz, followed by two periods of alternation at the frequency 1 kHz, and finally by two periods of alternation at the frequency 2 kHz.

Figure 6B:
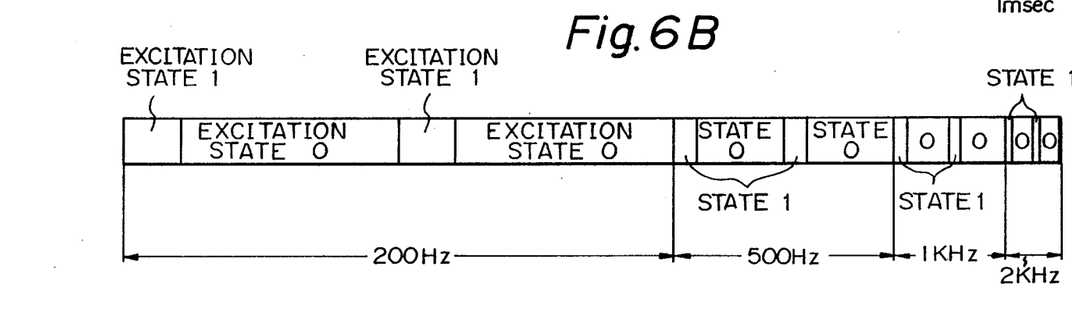
FIG. 6B is a diagram similar to of FIG. 6A, but showing a reversal of the order of the excitation states between which the alternation occurs.

In the case of the operation illustrated by FIG. 6B, the alternation between the excitation states 1 and 0 at the relatively low frequency of 200 Hz again causes oscillation of the rotor 1C between the respective stepped positions, whereby the rectilinearly movable arm 3 vibrates in a manner for substantially equally distributing any mechanical play (backlash) remaining between the lead screw 2 and the follower pin 4 in both of the vibrating directions indicated by the arrows L R on FIG. 1. Thereafter, as the frequency of alternation between the excitation states 1 and 0 is increased, for example, through the frequencies of 500 Hz and 1 kHz, to a suitably high frequency, for example, the frequency of 2 kHz, the rotor 1C, and hence the rectilinearly movable arm 3, finally ceases to oscillate or vibrate in response to the alternation of the excitation states, but rather comes to rest at a position which is precisely 4/5th of a step from the position corresponding to the excitation state 1 in the direction toward the stepped position corresponding to the excitation state 0. Hence, the distances from the position of rest of the rotor 1C to the stepped positions corresponding to the excitation states 0 and 1 is again in the ratio 1:4 which is the inverse of the duty ratio 4:1 with which the excitation states 0 and 1, respectively, are alternated even when using the excitation state 1 as the starting point.

Accordingly, it will be apparent that, in accordance with the present invention, there is no difference in the accuracy with which the head 5 is positioned whether the rotor 1C is moved from the stepped position corresponding to the excitation state 0 in the direction toward the stepped position corresponding to the excitation state 1, or the rotor IC is moved in the direction from its stepped position corresponding to the excitation state 1 toward the stepped position corresponding to the excitation state 0. In each case, as the frequency of alternation between the excitation states 0 and 1, or between the excitation states 1 and 0, is gradually increased, the center of vibration or oscillation converges at the desired position of rest of the rotor 1C in such a manner that the mechanical loss or play, for example, between the lead screw 2 and the follower pin 4, is equally distributed in both directions.

Although the invention has been specifically described above in its application to the positioning of the rotor 1C at a precisely determined position located between the stepped positions of the rotor corresponding to the excitation states 0 and 1, respectively, the invention is not limited in that respect. In other words, the invention can be similarly applied to the operation of the stepping motor 1 in order to position the rotor 1C thereof precisely at a desired position of rest between any two adjacent stepped positions, for example, between the stepped positions corresponding to the excitation states 1 and 2, the excitation states 2 and 3, or the excitation states 3 and 0, respectively.

Furthermore, in the embodiment of the invention described in detail above, the duty ratio (4:1) which is selected for the alternated excitation states 0 and 1, and which is the inverse of the ratio (1:4) of the distances from the desired position of rest of the rotor 1C to the stepped positions corresponding to the excitation states 0 and 1, respectively, is applied at all of the frequencies, that is, at the frequencies of 200 Hz and 500 Hz, as well as at 1 kHz and 2 kHz. However, in accordance with the present invention, it is only necessary that the selected duty ratio for the excitation states 0 and 1 be applied thereto at least during the increasing of the frequency of alternation to the value at which the rotor 1C no longer oscillates. Thus, the specifically described embodiment of this invention can be modified to employ a duty ratio of 1:1, or any other arbitrarily selected duty ratio, for the excitation states 0 and 1 during the initial stages of alternation between the excitation states, for example, during the alternation between the excitation states 0 and 1 at the frequencies of 200 Hz and 500 Hz, respectively, whereupon the duty ratio for the excitation states 0 and 1 is changed to 4:1 during the alternation at the frequency of 1 kHz and the alternation at the final frequency of 2 kHz.

Further, although a specific embodiment of the invention has been described, by way of example, with reference to a stepping motor having a two-phase excitation system, it will be appreciated that the invention can be similarly applied to stepping motors having a single-phase excitation system or a single-double-phase excitation system. Furthermore, although the specifically described embodiment illustrated in FIGS. 6A and 6B employs two periods of alternation between the excitation states 0 and 1 at each of the different frequencies 200 Hz, 500 Hz, 1 kHz and 2 kHz, it will be appreciated that the number of periods of alternation between the two excitation states at each of such frequencies can be freely varied.

By way of summary, it will seen that, in accordance with the present invention, a member driven by a stepping motor is brought to rest precisely at a desired position which is apart from a stepped position of the rotor by a distance which may be only a fraction of a natural step of the motor, without requiring the use of a reduction gear mechanism for that purpose. Further, the position at which the driven member is brought to rest is determined by merely suitably selecting a duty ratio for the alternate application of excitation states corresponding to respective stepped positions which are adjacent each other and between which it is desired to bring the driven member to rest. Thus, by selecting such duty ratio, the position of rest of the driven member may be readily selected to be anywhere between two adjacent stepped positions, rather than merely at a mid-point therebetween, for example, as in a conventional micro-stepping method.

It is further a feature of this invention that the accuracy with which the driven member is brought to rest at a selected position is improved, without regard to the direction in which the driven member approaches such position of rest. Thus, the present invention has the possibility of being embodied in a relatively more compact mechanism, for example, by the elimination of the conventionally employed reduction gear mechanism, and further has the possibility of providing greater flexibility in operation, for example, by suitably selecting the duty ratio with which the alternation of the excitation states is effected so as to provide a relatively wide range of variation of the rest position of the driven member, and also by permitting movement of the driven member to its rest position from either side thereof without adversely influencing the accuracy.

Although a specific embodiment of the invention has been described in detail herein with reference to the accompanying drawings, it will be appreciated that the invention is not limited to that precise embodiment, and that various changes and modifications may be effected therein by one skilled in the art without departing from the scope or spirit of the invention as defined in the appended claims.

What is claimed is:

1. A method of driving a stepping motor having a driven member and a plurality of phases to which input pulses are applied in predetermined sequences for establishing excitation states by which the driven member is stepped to respective positions, said method comprising the steps of:
   alternating between first and second of said excitation states corresponding to respective stepped positions which are adjacent each other and between which it is desired to bring said driven member to rest, the alternation between said first and second excitation states being initially effected at a frequency at which said driven member is made to oscillate between said stepped positions corresponding to said first and second excitation states, respectively;
   gradually increasing said frequency of alternation between said first and second excitation states to a value at which said driven member no longer oscillates with said alternation and comes to rest at a position between said stepped positions corresponding to said first and second excitation states, respectively;
   selecting a duty ratio for said first and second excitation states which inversely corresponds to the ratio of the distances from the desired position of rest of said driven member to said stepped positions of the latter corresponding to said first and second excitation states, respectively; and applying said duty ratio to said alternation between said first and second excitation states at least during said increasing of the frequency to said value at which said driven member no longer oscillates, whereby said driven member comes to rest at said desired position thereof.

2. A method according to claim 1; wherein said driven member is a rotor of said motor.

3. A method according to claim 1; wherein said driven member is attached to a rotor of said motor.

4. A method according to claim 1; wherein said duty ratio is also applied to said alternation between said first and second excitation states at said initially effected frequency.

5. A method according to claim 1; wherein said alternation is started with said first excitation state.

6. A method according to claim 1; wherein said alternation is started with said second excitation state.

7. A method according to claim 1; wherein said alternation between the first and second excitation states is halted upon the attainment of said desired position of rest by said driven member.

8. A method of operating a magnetic disk recording and/or reproducing apparatus which comprises an arm mounted for movements substantially parallel to a radius of a rotated magnetic disk, a magnetic head on said arm for recording and/or reproducing a signal in a selected circular track on the rotated magnetic disk when said selected track is tracked by said head, a stepping motor having a rotor and a plurality of phases to which input pulses are applied in predetermined sequences for establishing excitation states by which the rotor is stepped to respective positions, a lead screw directly coupled to said rotor for turning therewith, and a follower on said arm engaging said lead screw for effecting said movements of the arm, the extent of said movements in response to angular displacement of said rotor from one to another of adjacent stepped positions thereof being substantially greater than said movements required for tracking of said selected track by said head, said method comprising the steps of:

alternating between first and second of said excitation states corresponding to respective stepped positions which are adjacent each other and between which it is desired to bring said rotor to rest for tracking of said selected track by said head, the alternation between said first and second excitation states being initially effected at a frequency at which said rotor is made to oscillate between said stepped positions corresponding to said first and second excitation states, respectively;

gradually increasing said frequency of alternation between said first and second excitation states to a value at which said rotor no longer oscillates with said alternation and comes to rest at a position between said stepped positions corresponding to said first and second excitation states, respectively;

selecting a duty ratio for said first and second excitation states which inversely corresponds to the ratio of the distances from the position of rest of said rotor desired for tracking of said selected track by said head to said stepped positions of the rotor corresponding to said first and second excitation states, respectively; and applying said duty ratio to said alternation between said first and second excitation states at least during said increasing of the frequency to said value at which said rotor no longer oscillates, whereby said rotor comes to rest at said desired position thereof.

9. A method according to claim 8; wherein said duty ratio is also applied to said alternation between said first and second excitation states at said initially effected frequency.

10. A method according to claim 8; wherein said alternation is started with said first excitation state.

11. A method according to claim 8; wherein said alternation is started with said second excitation state.

12. A method according to claim 8; wherein said alternation between the first and second excitation states is halted upon the attainment of said desired position of rest by said rotor.

13. A positioning apparatus comprising:

a stepping motor having a driven member and a plurality of phases;

a driving circuit for applying input pulses to said phases in predetermined sequences so as to establish excitation states by which the driven member is stepped to respective positions; and processing means controlling said driving circuit and being programmed for alternating between first and second of said excitation states corresponding to respective stepped positions which are adjacent each other and between which it is desired to bring said driven member to rest, the alternation between said first and second excitation states being initially effected at a frequency at which said driven member is made to oscillate between said stepped positions corresponding to said first and second excitation states, respectively, gradually increasing said frequency of alternation between said first and second excitation states to a value at which said driven member no longer oscillates with said alternation and comes to rest at a position between said stepped positions corresponding to said first and second excitation states, respectively, selecting a duty ratio for said first and second excitation states which inversely corresponds to the ratio of the distances from the desired position of rest of said driven member to said stepped positions of the latter corresponding to said first and second excitation states, respectively, and applying said duty ratio to said alternation between said first and second excitation states at least during said increasing of the frequency to said value at which said driven member no longer oscillates, whereby said driven member comes to rest at said desired position thereof.

14. A positioning apparatus according to claim 13; wherein said driven member is a rotor of said motor.

15. A positioning apparatus according to claim 13; wherein said driven member is attached to a rotor of said motor.

16. A positioning apparatus according to claim 13; wherein said processing means is programmed to also apply said duty ratio to said alternation between said first and second excitation states at said initially effected frequency.

17. A positioning apparatus according to claim 13; wherein said processing means is programmed to start said alternation with said first excitation state.

18. A positioning apparatus according to claim 13; wherein said processing means is programmed to start said alternation with said second excitation state.

19. A positioning apparatus according to claim 13; wherein said processing means is programmed to halt said alternation between the first and second excitation states upon the attainment of said desired position of rest by said driven member.

20. A magnetic disk recording and/or reproducing apparatus comprising:
 an arm mounted for movements substantially parallel to a radius of a rotated magnetic disk;
 a magnetic head on said arm for recording and/or reproducing a signal in a selected circular track on the rotated magnetic disk when said selected track is tracked by said head;
 a stepping motor having a rotor and a plurality of phases;
 a driving circuit for applying input pulses to said phases in predetermined sequences so as to establish excitation states by which the rotor is stepped to respective positions;
 mechanical transmission means including a lead screw directly coupled to said rotor for turning therewith, and a follower on said arm engaging said lead screw for effecting said movements of the arm, the extent of said movements in response to angular displacement of said rotor from one to another of adjacent stepped positions thereof being substantially greater than said movements required for tracking of said selected track by said head; and
 processing means controlling said driving circuit and being programmed for alternating between first and second of said excitation states corresponding to respective stepped positions which are adjacent each other and between which it is desired to bring said rotor to rest for tracking of said selected track by said head, the alternation between said first and second excitation states being initially effected at a frequency at which said rotor is made to oscillate between said stepped positions corresponding to said first and second excitation states, respectively, gradually increasing said frequency of alternation between said first and second excitation states to a value at which said rotor no longer oscillates with said alternation and comes to rest at a position between said stepped positions corresponding to said first and second excitation states, respectively, selecting a duty ratio for said first and second excitation states which inversely corresponds to the ratio of the distances from the position of rest of said rotor desired for tracking of said selected track by said head to said stepped positions of the rotor corresponding to said first and second excitation states, respectively, and applying said duty ratio to said alternation between said first and second excitation states at least during said increasing of the frequency to said value at which said rotor no longer oscillates, whereby said rotor comes to rest at said desired position thereof.

21. A magnetic disk recording and/or reproducing apparatus according to claim 20; wherein said processing is programmed to also apply said duty ratio to said alternation between said first and second excitation states at said initially effect frequency.

* * * * *